(12) United States Patent
Kutrovich

(10) Patent No.: US 12,261,500 B2
(45) Date of Patent: Mar. 25, 2025

(54) THERMAL MANAGEMENT SYSTEM FOR AN ELECTRICAL MACHINE

(71) Applicant: ROLLS-ROYCE plc, London (GB)

(72) Inventor: Daniel Kutrovich, Budapest (HU)

(73) Assignee: Rolls-Royce plc

( * ) Notice: Subject to any disclaimer, the term of this patent is extended or adjusted under 35 U.S.C. 154(b) by 334 days.

(21) Appl. No.: 17/847,716

(22) Filed: Jun. 23, 2022

(65) Prior Publication Data

US 2023/0028212 A1    Jan. 26, 2023

(30) Foreign Application Priority Data

Jul. 19, 2021 (GB) ..................................... 2110346

(51) Int. Cl.
*H02K 5/20* (2006.01)
*B64D 27/24* (2006.01)

(52) U.S. Cl.
CPC ............... *H02K 5/20* (2013.01); *B64D 27/24* (2013.01)

(58) Field of Classification Search
CPC ............ H02K 5/20; H02K 5/203; H02K 9/19; H02K 1/20; H02K 2213/03
See application file for complete search history.

(56) References Cited

U.S. PATENT DOCUMENTS

| | | | |
|---|---|---|---|
| 7,948,126 B2 | 5/2011 | Fulton et al. | |
| 2014/0117796 A1* | 5/2014 | Kassler | H02K 5/203 |
| | | | 310/54 |
| 2018/0174098 A1* | 6/2018 | Andres | H02K 5/203 |
| 2020/0036259 A1* | 1/2020 | Strube | H02K 9/193 |
| 2020/0195095 A1* | 6/2020 | Yoo | B22C 9/10 |

FOREIGN PATENT DOCUMENTS

| | | |
|---|---|---|
| DE | 102012102406 A1 | 9/2013 |
| DE | 102015221777 A1 | 5/2017 |
| EP | 3076526 A1 | 10/2016 |
| EP | 3112713 A1 | 1/2017 |

OTHER PUBLICATIONS

European Search Report dated Dec. 7, 2022, issued in EP Patent Application No. 22179779.8.
Great Britian search report dated Apr. 21, 2022, issued in GB Patent Application No. 2110346.0.

* cited by examiner

*Primary Examiner* — Quyen P Leung
*Assistant Examiner* — Masoud Vaziri
(74) *Attorney, Agent, or Firm* — Barnes & Thornburg LLP

(57) ABSTRACT

A thermal management system for an electrical machine. The thermal management system has a housing circumferentially enclosing a bushing that has a tubular section. At least one fluid channel for a thermal medium is formed by channel walls within the housing and the bushing. A gap is provided or located between the tubular section of the bushing and the channel walls of the housing. The tubular section closes the at least one fluid channel off against a stator of the electrical machine, enabling a heat transfer between the stator and the thermal medium in the at least one channel across the tubular section of the bushing.

20 Claims, 5 Drawing Sheets

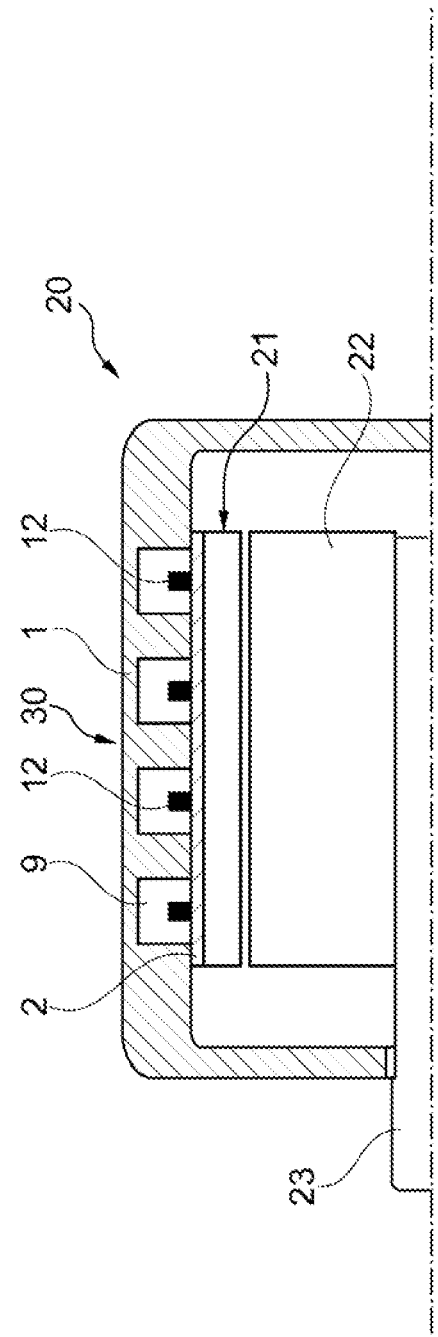

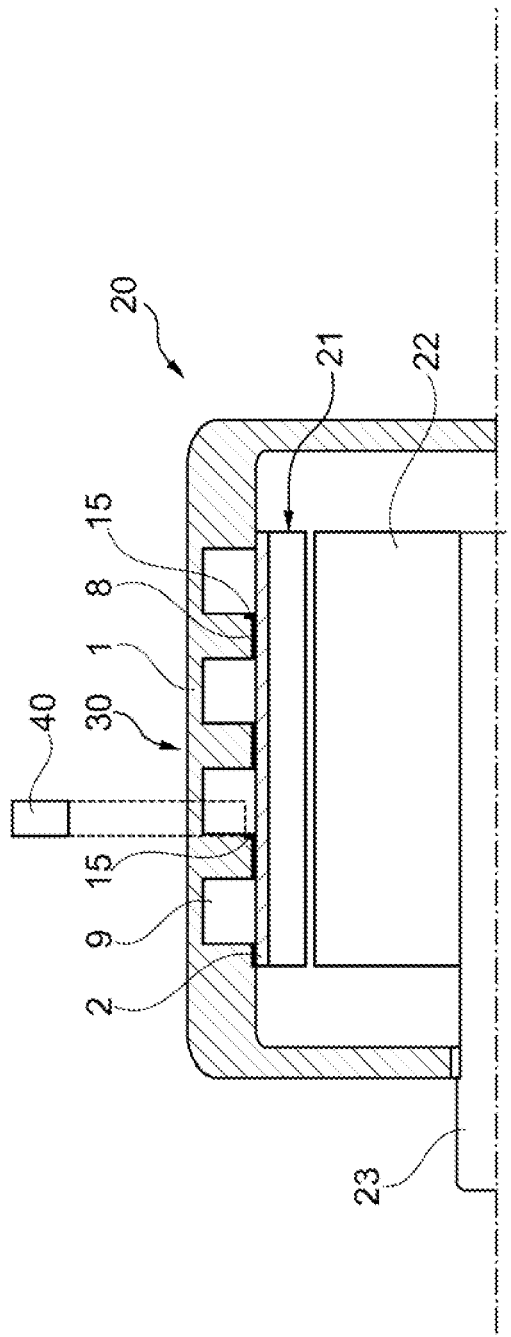

THERMAL MANAGEMENT SYSTEM FOR AN ELECTRICAL MACHINE

CROSS-REFERENCE TO RELATED APPLICATIONS

This specification is based upon and claims the benefit of priority from United Kingdom patent application number GB 2110346.0 filed on Jul. 19, 2021, the entire contents of which is incorporated herein by reference.

BACKGROUND

Technical Field

The disclosure relates to a thermal management system for an electrical machine.

Description of the Related Art

Electric machines are increasingly used e.g. in automotive or in aeronautical applications. In particular, in cases of high voltage and high power applications, the electric machines generate considerable amounts of heat which has to be removed efficiently from the machines.

A liquid cooling system for this purpose is e.g. known from U.S. Pat. No. 7,948,126 B2, which describes a cooling jacket round the electric machine.

As electric machines are stored and/or operated under a wide range of thermal conditions, thermal management systems reducing thermal stresses within the electric machine are required.

There is a need for a thermal management system that addresses at least some of these issues or at least provides a useful alternative.

SUMMARY

In a first aspect there is provided a thermal management system for an electrical machine. The thermal management system has a housing circumferentially enclosing a bushing that has a tubular section. At least one fluid channel for a thermal medium is formed by channel walls within the housing and the bushing. A gap is provided or located between the tubular section of the bushing and the channel walls of the housing. The tubular section closes the at least one fluid channel off against a stator of the electrical machine, enabling a heat transfer between the stator and the thermal medium in the at least one channel across the tubular section of the bushing.

The gap prevents the accumulation of mechanical stress, by providing some expansion space under thermal loads.

The channel wall can be some sort of protrusions extending radially from the housing and/or the bushing. The channel walls can be in one piece with the housing and/or the bushing or they can be connected (e.g. welded) to the housing and/or bushing.

Embodiments of the thermal management system can be used in particular for electrical machines with a high power-to-weight ratio, which are e.g. used in aircrafts. Generally those embodiments can be used for electrical machines with a radial heat flux.

In some embodiments, the stator of the electrical machine comprises a winding which radially encloses a lamination stack. As the thermal behavior of the lamination stack is critical, the arrangement together with the enclosing tubular section of the bushing is beneficial regarding the thermal stress. In particular, for an embodiment in which the bushing, in particular the tubular section of the bushing is less stiff than the lamination stack. Stiff in this context means that the maximal or mean radial deformation of the bushing, in particular the enclosing tubular part of the bushing is less than the maximal or mean radial deformation of the lamination stack under the same operating condition or load. The lamination stack can comprise Co—Fe or Si—Fe as materials.

In some embodiments, the tubular section of the bushing has a smooth surface, which allows for a relatively easy deformation (i.e. less stiffness).

One way of reducing the stiffness is a thin walled bushing, e.g. with a radial wall thickness of the bushing in the range of 0.8 to 0.3 times the thickness of the wall of the housing, in particular in the range of 2 to 5 mm, in particular 3 mm.

The tubular section of the bushing closes the at least one fluid channel off against a stator (located radially inwards from the bushing) of the electrical machine, enabling a heat transfer between the stator and the thermal medium in the at least one channel across the tubular section of the bushing.

For improved stress properties, the linear thermal expansion coefficients of the materials of the housing and the bushing, in particular the tubular part of the bushing differ only by 10% or less. This means that both materials will deform under thermal load more or less the same. If the housing and/the bushing comprises or are made from the same material, in particular aluminum, both parts will deform in the same way under the thermal load.

In some embodiments, the connection between the housing and the bushing comprises at least one seal, in particular an O-ring seal, and/or at least one welding connection. In particular, the at least one seal and the at least one the welding connection are of identical design and dimension. Again, this allows for better thermal stress distribution within the electrical machine. A further improvement in that direction can be made, if the at least one seal and/or the at least one welding connection are axially located towards the axial ends of the housing, in particular axially outside the terminal channels (i.e. axially outermost channels). This implies that the heat transfer is not impeded by the seals and/or the welding connections because they lie axillary outside the main heat transfer area of the bushing.

In some embodiments, a torque bearing connection between the lamination stack and the bushing is made through an interference fit.

In some embodiments, the yoke of the lamination stack has a radial thickness in the range of 1 to 5 times the thickness of the tubular section of the bushing. This means that the thickness of the yoke is relatively thin resulting in an improved heat transfer.

In some embodiments, the housing and the bushing, in particular the tubular section of the bushing, are in one part. In particular the housing and the bushing, in particular the tubular section of the bushing, are in one part, but comprising different materials. This can be manufactured through an additive manufacturing process.

In some embodiments, the thermal medium is selected from water, oil and air.

Thermal loads during operation are typically dynamic. This might result in changing size of the gap.

In some embodiments, a control system is used for adjusting the gap between the housing and the bushing by controlling a flow property of the thermal medium, in particular the flow rate and/or temperature. If e.g. the gap is reduced, the cooling load could be increased to counteract the gap closing. The control system may include a sensor that configured to detect the width of the gap, and when the gap is below a threshold value, the cooling load is automatically changed by the control system to bring back the gap to a desired size.

Embodiments of the thermal management system can be applied, for example, to an electrical motor or an electrical generator.

In a second aspect there is provided an electrical machine that has a thermal management system of the first aspect.

In a third aspect there is provided an aircraft that has at least one electrical machine of the second aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

DESCRIPTION OF THE DRAWINGS

Embodiments will now be described by way of example only, with reference to the Figures, in which:

FIG. 4 shows a second embodiment of the thermal management system of the present disclosure that differs from the embodiment shown in FIG. 2 by having a bushing that is stiffer than the bushing in the embodiment shown in FIG. 2.

FIG. 5 shows a third embodiment of the thermal management system of the present disclosure that includes a sensor.

Figure 1:
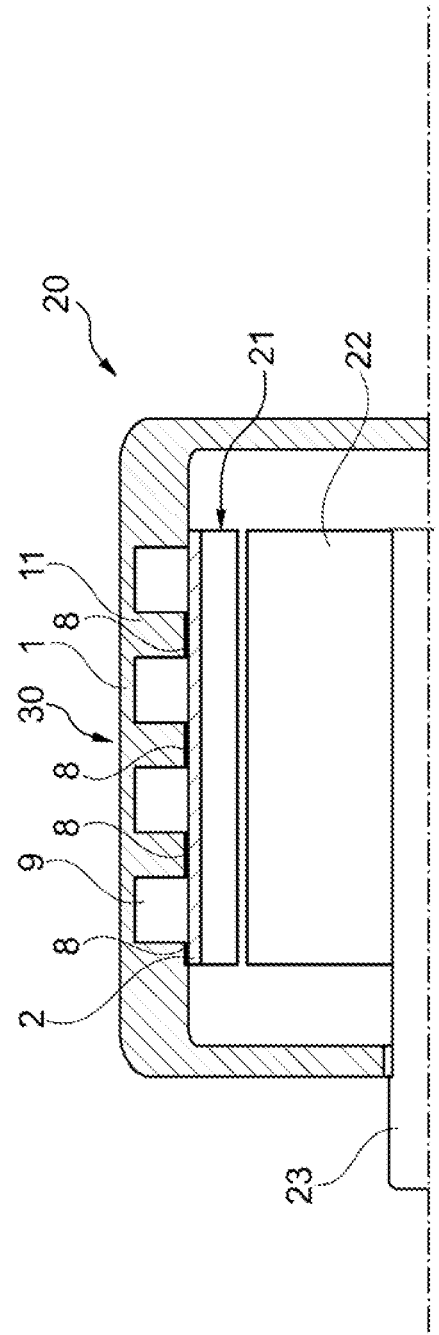
FIG. 1 shows a schematic half-section of an electrical machine with an embodiment of a thermal management system of the present disclosure.

The following table lists the reference numerals used in the drawings with the features to which they refer:

| Ref no. | Feature | FIG. |
|---|---|---|
| 1 | housing of electrical machine | 1 2 4 5 |
| 2 | bushing | 1 2 4 5 |
| 2' | tubular section of bushing | 2 3 |
| 2" | radial section of bushing | 2 |
| 3' | first seal | 2 |
| 3" | second seal | 2 |
| 4 | winding | 2 |
| 5 | lamination stack | 2 3 |
| 6 | connection between bushing and housing | 2 |
| 7 | interference fit | 2 3 |
| 8 | gap between housing and bushing | 1 2 5 |
| 9 | channel for thermal management medium | 1 2 4 5 |
| 9', 9" | terminal channels (in axial direction) | 2 |
| 10 | yoke | 3 |
| 11 | channel walls | 1 2 |
| 12 | protrusions | 4 |
| 15 | sensor | 5 |
| 20 | electrical machine | 1 4 5 |
| 21 | stator | 1 4 5 |

-continued

| Ref no. | Feature | FIG. |
|---|---|---|
| 22 | rotor | 1 4 5 |
| 23 | shaft | 1 4 5 |
| 30 | indirect thermal management system | 1 2 4 5 |
| 40 | control system | 5 |
| D1 | thickness (in radial direction) of the yoke of the lamination stack | 3 |
| D2 | thickness (in radial direction) of the tubular part of the bushing | 3 |
| Q | heat flux | 2 |

DETAILED DESCRIPTION

Aspects and embodiments of the present disclosure will now be discussed with reference to the accompanying figures. Further aspects and embodiments will be apparent to those skilled in the art.

In FIG. 1 an electrical motor 20 is shown in a half-sectional view. Inside a housing 1 of the electrical motor 20, a rotor 22 and a stator 21 are operating in a generally known way. During operation a shaft 23 is rotated, generating shaft work from electrical power.

During operation, the electrical motor 20 also generates heat Q which generally flows radially outward in the electrical machine 20. Therefore, an indirect thermal management system 30 is located on the radial outside of the electric motor 20. Indirect thermal management means that a thermal fluid (e.g. air, cooling water) is not in contact with the internals of the electrical motor 20. In principle (if operation conditions require this), it is also possible to use the thermal management system 30 for heating, i.e. the heat flow Q would be reversed.

In the following, aspects of a cooling effected by the thermal management system 30 are described.

For this purpose, the thermal management system 30 comprises a number of channels 9 in the housing 1 for circulating a thermal medium, here a fluid cooling medium such as e.g., water, oil or air. The inlets and outlets for the cooling medium are not shown here for the sake of simplicity.

In the embodiment shown, the channels 9 are parallel to each other extending circumferentially around the tubular section 2' of the bushing 2. The channels are annular and thus tight. In other embodiments, the channels 9 might a different form and/or orientation (e.g., they are inclined against the rotational axis). The channels 9 are here formed or machined into the material of the housing 1. In a further embodiment (see FIG. 4), the channels 9 are formed by protrusions from the bushing 2 and the housing 1.

In the embodiments shown, the channels 9 are walled off by walls 11 of the housing, the walls 11 protruding radially inwards and by a bushing 2 which generally comprises a thin-walled tubular section 2'. The tubular section 2' of the bushing 2 closes the channels 9 off from the stator 21.

A gap 8 between the ends of the walls 11 and the bushing 2 allows for some expansion space under thermal loads.

It should be noted that the electrical motor 20 is only an example for an electrical machine. Other electrical machines 20 which can be used in connection with the embodiment of a thermal management system 30 can e.g. be generators.

Figure 2:
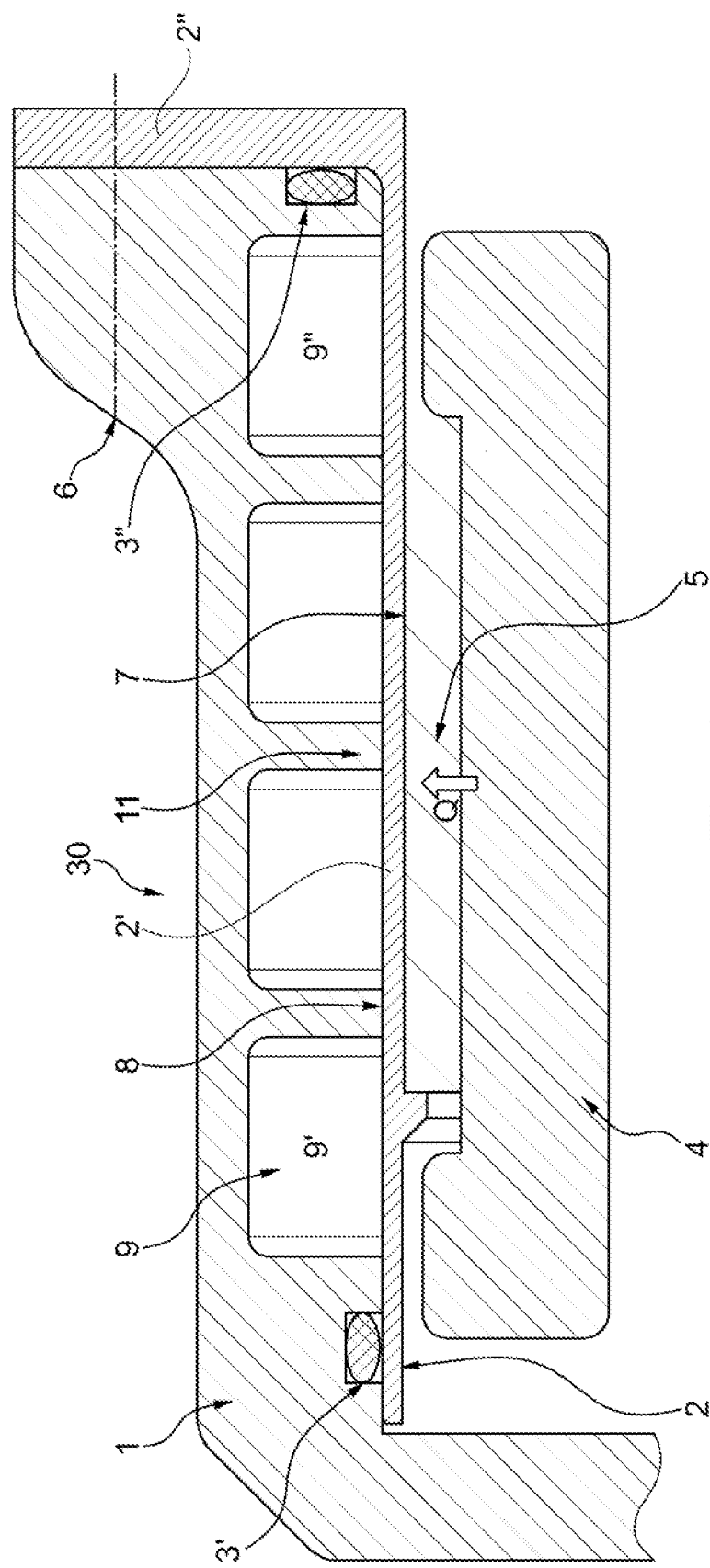
FIG. 2 shows a sectional view of an embodiment of the thermal management system of the present disclosure.

In FIG. 2 details of an embodiment of a thermal management system 30 are shown, comprising a cooling jacket for indirectly cooling the electric machine 20 with a cooling medium.

The thermal management system 30 comprises the housing 1 of the electrical machine 20 and the bushing 2. The bushing 2 comprises the already mentioned tubular section 2' which is concentrically located within the housing 1 and a radial section 2" which extends radially outwards.

Between the housing 1 and the bushing 2 two seals 3', 3" prevent the leaking of the fluid cooling medium.

A first seal 3' comprises a radially sealing O-ring which is positioned in a circumferential groove on the inside of the housing 1. The sealing is against the tubular section 2' of the bushing 2.

A second seal 3" is also an O-ring, but positioned in axial groove in the housing 1, providing an axial seal against the radial section 2" of the bushing.

In other embodiments different types of seals can be used. The housing 1 and the bushing 2 are connected through a bolt connection 6 which is shown here only in exemplary manner.

In other embodiments the connection between the housing 1 and the bushing 2 can be made by welding connections.

The stator 21 comprises a winding 4 and radially outside from the winding 4, a lamination stack 5. The lamination stack 5 transfers torque to the bushing 2—located radially outwards from the lamination stack 5—typically through an interference fit 7.

In an application with a high power-to-weight-ratio, the housing 1 can be made from aluminum as this lightweight. It also has a much higher thermal expansion coefficient than the lamination stack 5. This means that under operation the thermal load on the housing 1 will radially expand outwards faster than the lamination stack 5.

In case of an interference fit, a pre-stress will be introduced between the lamination stack 5 and the bushing 2 during assembly. The stress in this connection will increase or decrease due to the rather wide temperature variations.

To ensure an efficient heat transfer from the internal parts of the electrical machine 20 radially outwards, the lamination stack 5 and the bushing 2 should remain in physical contact through the interference fit 7, i.e., no gap should occur.

For an efficient heat transfer, the bushing 2 is designed to be less stiff than the housing 1. Here the heat transfer takes part across the tubular section 2' of the bushing 2. The tubular section 2' of the bushing comprises a thin wall which is smooth on both sides. In particular, no protrusions extend from the tubular section 2' as they would stiffen it, in particular relative to the lamination stack 5. The reduced stiffness in the tubular section 2' of the bushing 2 results in a reduced thermal stress in the lamination stack 5. This enables a thermal expansion of the bushing 2 (i.e. the tubular section 2') and the lamination stack 5 system which is governed by the thermal expansion of the lamination stack 5.

By designing the tubular section 2' of the bushing 2 less stiff, the thermal stress can be reduced, so that materials more optimized for their electromagnetic properties can be used in the electric machine 20.

The channel walls 11 in this embodiment are solely present in the housing 1, making the housing 1 relatively stiff.

In one embodiment, a gap 8 between the housing 1 and the tubular section 2' of the bushing 2 is provided to ensure that the stiffness of the bushing 2 will not change due to a contact with the housing 1, in particular with the protruding channel walls 11. This means that the tubular section 2' preferably should not be in contact with the housing 1 under in all operation conditions and/or during storage.

In one embodiment, the materials of the housing 1 and the bushing 2, in particular the material of the tubular section 2', are the same (e.g. aluminum). Therefore, the linear thermal expansion coefficients of both parts are the same, reducing the thermal stresses overall. In other embodiments, the materials can be different, but the linear thermal expansion coefficients should not differ by more than 10% (or less) to ensure limited thermal stresses under operation.

Generally, it is possible that the bushing 2 can comprise or is made of steel, Inconel or titanium.

A further design feature to reduce additional thermal stresses at the connection between the housing 1 and the bushing 2 (e.g. the bolt connection 6), the seals 3', 3" should be located reasonably far from the lamination stack 5. In the embodiment shown, the seals 3', 3" are axially located outside the axial first terminal channel 9' (axially leftmost) and outside the axially last terminal channel 9" (axially rightmost), i.e., the seals are axially located outside the axial end channels 9', 9".

Under operation, there will be thermal stress in the bushing 2, in particular the tubular section 2' of the bushing. But by keeping the tubular section 2' smooth, the stress concentration is reduced.

In one embodiment of the thermal management system 30, a yoke 10 of the lamination stack 5 (see FIG. 3) is relatively thin. The radial thickness D1 of the yoke 10 should be in the range of 1 to 5 times the radial thickness D2 of the tubular section 2' of the bushing 2.

The embodiments allow in high power-to-weight ratio electric machines 20 a better choice of materials, in particular for the lamination stack 5, as the thermal stress issue is addressed by the design of the bushing 2. By choosing the materials not for their thermal properties but rather their mechanical or electrical properties, the overall weight of the electrical machine and the efficiency can be improved.

Figure 3:
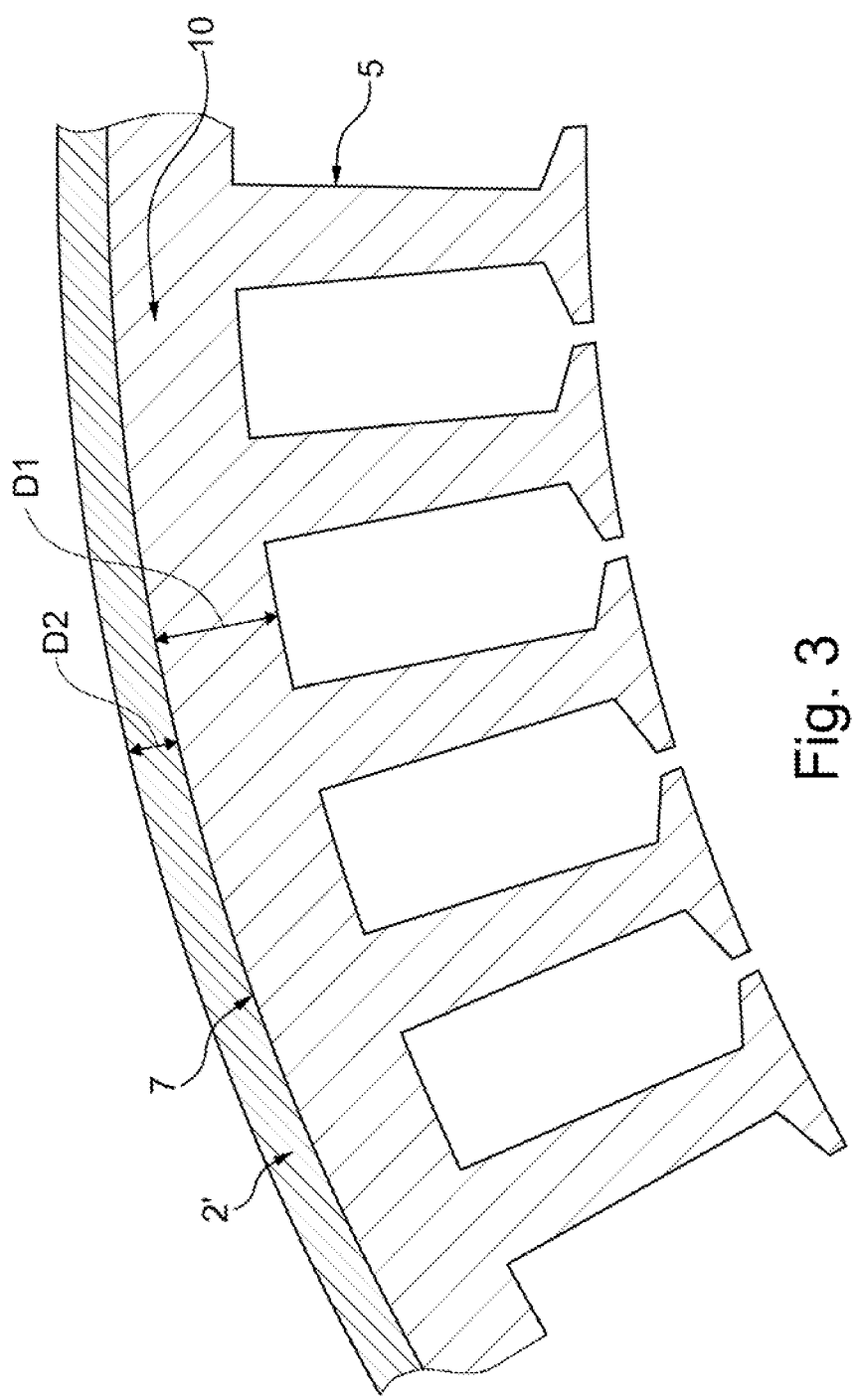
FIG. 3 shows a detail view of a lamination stack in an embodiment of the thermal management system of the present disclosure.

In the embodiments shown in FIGS. 1 to 3, the housing 1 and the bushing 2 were two separate parts. In a different embodiment the housing and the bushing 2 can be in one piece, e.g. manufactured by a casting process or an additive manufacturing process. In latter, it would be even possible to print the bushing 2 and the housing 1 with different materials.

These embodiments can be used in electrical machines under a wide temperature range for example between −65 to 120° C. This reduced thermal stress on the lamination stack allows the use of optimized material resulting an improved overall efficiency of the electrical machine.

In FIG. 4 an embodiment is shown that uses a bushing 2 which is somewhat stiffer than the bushing 2 in the embodiment shown in FIG. 2. Otherwise, the above description is applicable. Here, some protrusions 12 extend radially outwards from the tubular section 2' of the bushing.

In FIG. 5 a further variation of the embodiment shown in FIG. 1 is shown. As mentioned above, the gap 8 between the bushing 2 and the housing 1 prevents the built-up of mechanical stress between the bushing 2 and the housing 1. In the embodiment shown, a sensor 15 detects the width of the gap 8 e.g. by using a capacitive measurement, a resistance measurement or a change in mechanical vibrations (e.g. through a piezoresitive sensor). If the gap 8 is e.g. below a certain threshold value, the cooling load is automatically changed by a control system 40 to bring back the gap 8 to the desired size.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A thermal management system for an electrical machine, the thermal management system comprising a housing circumferentially enclosing a bushing that has a tubular section and a radial section that extends radially outward from the tubular section, wherein a connection between the housing and the bushing comprises a first seal arranged between the housing and the tubular section near a first axial end of the housing and a second seal arranged between the housing and the radial section near a second axial end of the housing, wherein at least one fluid channel for a thermal medium is formed by channel walls within the housing and the bushing, with a gap being provided or located between the tubular section of the bushing and terminal ends of the channel walls of the housing on either axial side of the at least one fluid channel, and the tubular section closes the at least one fluid channel off against a stator of the electrical machine, enabling a heat transfer between the stator and the thermal medium in the at least one channel across the tubular section of the bushing, wherein the gap ensures that under all operating conditions, a stiffness of the bushing does not change due to contact with the housing.

2. The thermal management system of claim 1, wherein the stator includes a winding which is radially enclosed by a lamination stack.

3. The thermal management system of claim 1, wherein the bushing is less stiff than the lamination stack.

4. The thermal management system of claim 1, wherein a radial wall thickness of the bushing is in the range of 0.8 to 0.3 times the thickness of the wall of the housing.

5. The thermal management system of claim 1, wherein the maximal or mean radial deformation of the bushing is less than the maximal or mean radial deformation of the lamination stack under the same operating condition or load.

6. The thermal management system of claim 1, wherein the tubular section of the bushing has a smooth surface.

7. The thermal management system of claim 1, wherein the linear thermal expansion coefficients of the materials of the housing and the bushing differ by 10% or less.

8. The thermal management system of claim 1, wherein a torque bearing connection between the lamination stack and the bushing made through an interference fit.

9. The thermal management system of claim 1, wherein a yoke of the lamination stack has a radial thickness in the range of 1 to 5 times the thickness of the tubular section of the bushing.

10. The thermal management system of claim 1, wherein the housing and the bushing are one part.

11. The thermal management system of claim 10, wherein the housing and the bushing are one part but comprise different materials as manufacturable through an additive manufacturing process.

12. The thermal management system of claim 1, wherein the thermal medium is a cooling fluid selected from water, oil and air.

13. The thermal management system of claim 1, wherein the electrical machine is an electrical motor or an electrical generator.

14. An electrical machine including a thermal management system of claim 1.

15. An aircraft including at least one electrical machine of claim 14.

16. The thermal management system of claim 1, wherein the bushing has at least one protrusion that extends radially outward from the tubular section of the bushing into the at least one fluid channel.

17. A thermal management system for an electrical machine, the thermal management system comprising:
 a housing circumferentially enclosing a bushing that has a tubular section, wherein at least one fluid channel for a thermal medium is formed by channel walls within the housing and the bushing, with a gap being provided or located between the tubular section of the bushing and terminal ends of the channel walls of the housing on either side of the at least one fluid channel, and the tubular section closes the at least one fluid channel off against a stator of the electrical machine, enabling a heat transfer between the stator and the thermal medium in the at least one channel across the tubular section of the bushing, and
 a control system that adjusts the gap between the housing and the bushing by controlling a flow property of the thermal medium, the control system including a sensor configured to detect the width of the gap, and when the gap is below a threshold value, the cooling load is automatically changed by the control system to bring back the gap to a desired size.

18. The thermal management system of claim 17, wherein the flow property of the thermal medium is flow rate or temperature.

19. The thermal management system of claim 17, wherein the sensor is configured to measure one of a capacitive measurement, a resistance measurement, or a change in mechanical vibrations to detect the width of the gap.

20. A thermal management system for an electrical machine, the thermal management system comprising:
 a bushing having a tubular section that extends circumferentially about an axis, and
 a housing circumferentially enclosing the bushing, the housing formed to include at least one fluid channel walled off by channel walls that extend radially inward toward the tubular section of the bushing, wherein terminal ends of the channel walls are spaced apart from the tubular section of the bushing to define a gap therebetween to ensures that under all operating conditions, a stiffness of the bushing does not change due to contact with the housing,
 wherein the tubular section closes the at least one fluid channel off against a stator of the electrical machine, enabling a heat transfer between the stator and the thermal medium in the at least one channel across the tubular section of the bushing.

* * * * *